(12) United States Patent
Klincewicz et al.

(10) Patent No.: US 7,965,654 B2
(45) Date of Patent: *Jun. 21, 2011

(54) SYSTEM AND METHOD FOR DESIGNING A NETWORK

(75) Inventors: John Gregory Klincewicz, Ocean Township, NJ (US); James Anthony Schmitt, Little Silver, NJ (US); Richard Tekee Wong, Tinton Falls, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/627,532

(22) Filed: Nov. 30, 2009

(65) Prior Publication Data

US 2010/0074115 A1    Mar. 25, 2010

Related U.S. Application Data

(63) Continuation of application No. 11/185,100, filed on Jul. 20, 2005, now Pat. No. 7,626,945, which is a continuation of application No. 10/706,432, filed on Nov. 12, 2003, now Pat. No. 6,934,259, which is a continuation of application No. 09/484,178, filed on Jan. 18, 2000, now Pat. No. 6,697,334.

(51) Int. Cl.
   *H04L 12/28* (2006.01)
(52) U.S. Cl. .................. 370/254; 370/250; 370/238
(58) Field of Classification Search .............. 370/254, 370/238, 252, 250
   See application file for complete search history.

(56) References Cited

U.S. PATENT DOCUMENTS

| | | | |
|---|---|---|---|
| 5,561,790 | A | 10/1996 | Fusaro |
| 6,104,700 | A | 8/2000 | Haddock et al. |
| 6,175,870 | B1 | 1/2001 | Gawlick et al. |
| 6,240,463 | B1 | 5/2001 | Benmohamed et al. |
| 6,373,822 | B1 | 4/2002 | Raj et al. |
| 6,377,551 | B1 | 4/2002 | Luo et al. |
| 6,385,201 | B1 | 5/2002 | Iwata |
| 6,411,603 | B1 | 6/2002 | Ahuja et al. |
| 6,463,067 | B1 | 10/2002 | Hebb et al. |
| 6,483,805 | B1 | 11/2002 | Davies et al. |
| 6,493,317 | B1 | 12/2002 | Ma |
| 6,510,141 | B1 | 1/2003 | Ramfelt et al. |
| 6,529,499 | B1 | 3/2003 | Doshi et al. |
| 6,563,793 | B1 | 5/2003 | Golden et al. |
| 6,578,086 | B1 | 6/2003 | Regan et al. |
| 6,594,268 | B1 | 7/2003 | Aukia et al. |
| 6,594,278 | B1 | 7/2003 | Baroudi |
| 6,697,334 | B1 | 2/2004 | Klincewicz et al. |
| 6,711,607 | B1 | 3/2004 | Goyal |
| 6,724,722 | B1 | 4/2004 | Wang et al. |

(Continued)

*Primary Examiner* — Dang T Ton
*Assistant Examiner* — Pamit Kaur

(57) ABSTRACT

A system and computer-readable medium for designing a network are disclosed. A network is designed by a system having modules configured to perform steps that generate the network wherein nodes originate and terminate traffic to keep delay related to node-to-node delay-sensitive communication below a threshold. The computer-readable medium stores instructions for controlling a computing device to design the network. The instructions comprise obtaining an initial network topology including links and traffic routing based on a volume of traffic, allocating a maximum delay to each link in the network topology in proportion to a square root of an imputed cost for each of the links, sizing a bandwidth required for each of the links based on a current traffic routing and at least one of a maximum delay allocated to the link, determining link lengths and rerouting traffic according to shortest paths with respect to the determined link lengths.

20 Claims, 4 Drawing Sheets

U.S. PATENT DOCUMENTS

| | | |
|---|---|---|
| 6,744,767 B1 | 6/2004 | Chiu et al. |
| 6,745,246 B1 | 6/2004 | Erimli et al. |
| 6,769,024 B1 | 7/2004 | Natarajan et al. |
| 6,934,259 B2 | 8/2005 | Klincewicz et al. |
| 7,280,481 B2 | 10/2007 | Rong |
| 7,626,945 B1 * | 12/2009 | Klincewicz et al. .......... 370/254 |

* cited by examiner

SYSTEM AND METHOD FOR DESIGNING A NETWORK

PRIORITY CLAIM

The present application is a continuation of U.S. patent application Ser. No. 11/185,100, filed Jul. 20, 2005, which is a continuation of U.S. patent application Ser. No. 10/706,432, filed Nov. 12, 2003, now U.S. Pat. No. 6,934,259, which is a continuation of U.S. application Ser. No. 09/484,178, filed Jan. 18, 2000, U.S. Pat. No. 6,697,334, the contents of which are incorporated herein by reference in their entirety.

FIELD OF INVENTION

The present invention is directed to a method and apparatus for designing a packet network that supports Quality of Service.

DESCRIPTION OF RELATED ART

There has been a shift in the design of communication networks from diverse data networks, each of which is dedicated to a class of applications, to unified networks, typically utilizing Internet Protocol (IP). As a result, an increased volume of diverse data traffic is being carried over IP networks. For example, the increased traffic may include mission-critical applications such as stock investment transactions and other forms of electronic commerce. The increased traffic may also include other emerging applications, such as voice and video data. Such traffic is sensitive to delay over the network. Accordingly, these applications require better than best-effort IP network service. This represents a change from more long-standing IP applications, such as electronic mail, web browsing and file transfer, which can tolerate considerable delay. Because both delay-sensitive and delay-tolerant applications are being served together, delay-sensitive applications may not receive sufficient resources to satisfy delay requirements.

SUMMARY OF THE INVENTION

The invention provides a method and apparatus for designing a network that supports an integrated environment for all types of applications while satisfying individual performance requirements and maintaining high utilization. In one embodiment, an initial network topology is retrieved or created, including links and traffic routing based on a volume of traffic. A maximum delay may then be allocated to each link in the network topology so that the delay limits on node-to-node dela-sensitive communication are satisfied. A bandwidth required for each link is sized, based on a current traffic routing as well as a maximum delay allocated to the link or total link utilization. Link lengths may then be determined and traffic may be rerouted according to shortest paths with respect to the link lengths. These steps are repeated until the network design ceases to change.

Various specific implementations are possible:
Delay allocation, link length and routing may be determined separately for each of different traffic classes and link bandwidths may be sufficiently sized for all of the traffic classes.
The network topology may be systematically examined to determine if eliminating and/or adding any given link would improve the cost, or other relevant metric, of the network.
Maximum delays may further be allocated to the links in proportion to the square root of an imputed cost for each link.
The size of a bandwidth may be determined by assigning virtual channels to each of the traffic classes, with each virtual channel being sized separately; a total bandwidth on the link may be based on the sum of the bandwidths of the virtual channels as well as on a maximum utilization factor for the links.
Link lengths may additionally be determined based on the marginal cost of the link with respect to the total traffic that is routed on it by taking the product of a marginal cost of the bandwidth with respect to current link bandwidth required and a marginal link bandwidth required with respect to the traffic routed on the link.
The same set of link lengths may be used for every class of traffic based on a weighted sum of the link lengths determined separately for each traffic class.

BRIEF DESCRIPTION OF THE DRAWINGS

The preferred embodiments of the present invention will be described with reference to the following figures, wherein like numerals designate like elements, and wherein.

DETAILED DESCRIPTION OF PREFERRED EMBODIMENTS

Figure 1:
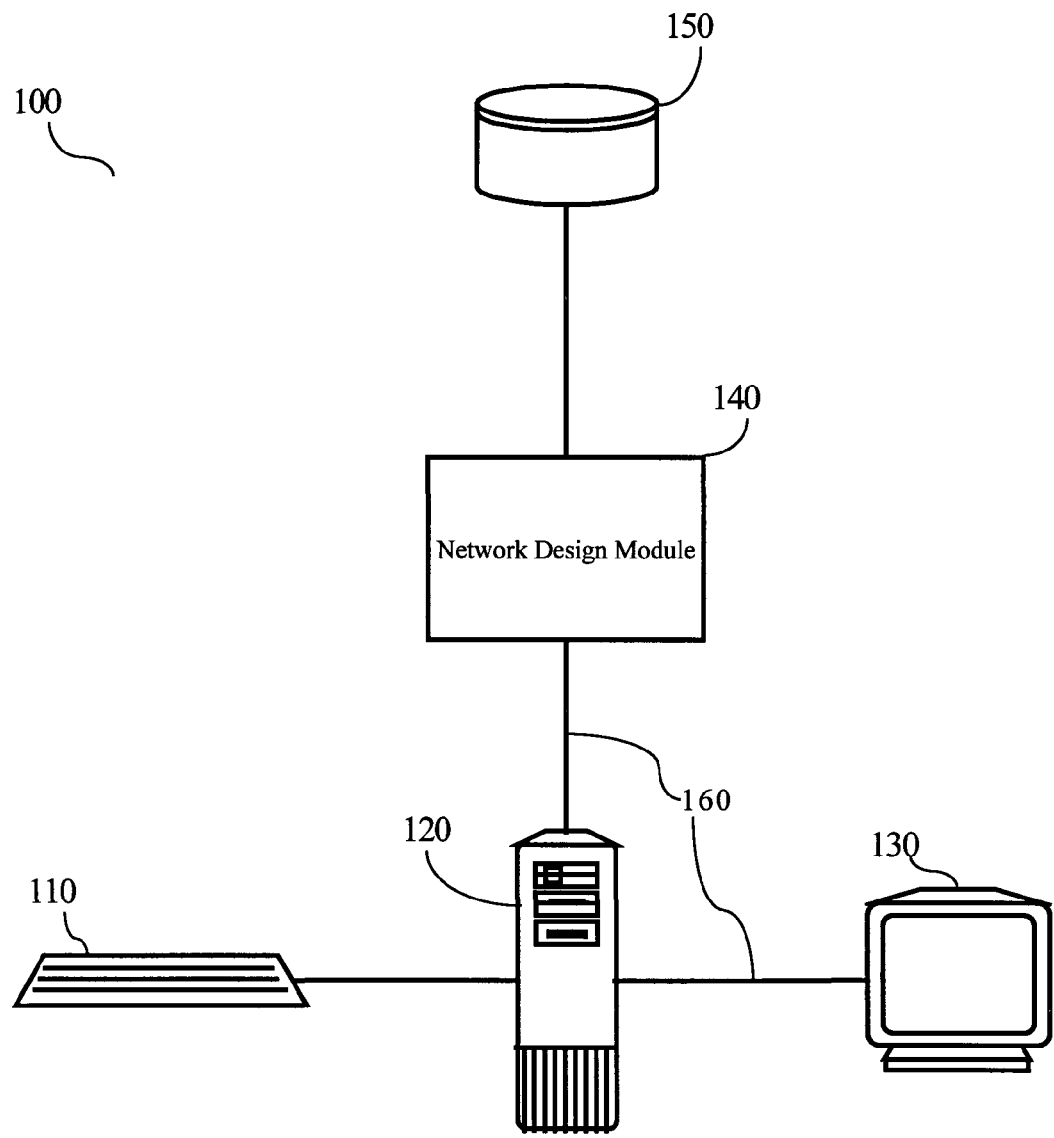
FIG. 1 is an exemplary block diagram of a system according to one embodiment of the invention.

FIG. 1 is an exemplary block diagram of a system 100 according to one embodiment of the invention. The system 100 may include an input device 110, a main central processing unit (CPU) 120, an output device 130, a network design module 140, a database 150 and a bus 160. The input device 110 may include a keyboard, keypad, scanner, microphone or any other device that is useful for inputting data to a system. The output device 130 may include a monitor, an LCD display, a printer, a modem or any other device that is useful for outputting data.

The main CPU 120 may include a processor, a personal computer, a notebook computer, a mainframe computer, or any other device that is useful for processing data. The database 150 may be stored computer-readable media such as RAM, ROM, CD-ROM, a hard disk drive, a floppy disk drive, or any other memory device that is useful for storing data. The bus 160 may include a local bus on a motherboard, a local area network (LAN), a wide area network (WAN), or any other data network that is useful for transferring data.

The input device 110, the main CPU 120, the output device 130, the network design module 140, and the database 150 communicate with each other through the bus 160. Communication and data signals are received by the bus 160 from a device such as the input device 110 or the network design module 140. The communication and data signals are routed in the bus 160 by way of, for example, controllers and routers (not shown) to a destination device such as the network design module 140 or the output device 130 which receives the communication and data signals.

The network design module 140 may be an independent device coupled to the bus 160 (as shown), or it may be distributed throughout the devices attached to the bus 160. For example, the network design module 140 may be stored in the database 150 and processed in the main CPU 120.

In operation, when a designer of a network uses the input device 110, for example, and requires the services of the network design module 140, data signals are routed from the input device 110 via the bus 160 to the main CPU 120. The data signals may additionally be routed via the bus 160 to the network design module 140, the database 150 and/or the output device 130. The network design module 140 may monitor usage of the input device 110, processing by the main CPU 120, accessing of the database 150 and/or output on the output device 130 and it may perform network design processing based on data generated, sent and received by the devices. All processing and data manipulations may be stored on the database 150 and output through the output device 130.

When the designer accesses the network design module 140, the network design module 140 may obtain an initial network topology, including links and traffic routing, based on a volume of traffic, allocate a maximum delay to each link in the network topology so that the delay limits on node-to-node communication are satisfied, size a bandwidth required for each link based on a current traffic routing as well as a maximum delay allocated to the link or total link utilization, determine link lengths and reroute traffic according to shortest paths with respect to the link lengths. The network design module 140 may obtain the initial network topology by retrieving the initial network topology from a memory or the database 150 or by creating the initial network topology by the use of a topology design module or the like. The network design module 140 may further repeat all of the mentioned steps until the network design ceases to change.

Various implementations are possible:

- The network design module 140 may also determine delay allocation, link length and routing separately for each of a plurality of traffic classes and may sufficiently size link bandwidths for all of the plurality of traffic classes.
- The network design module 140 may additionally systematically examine the network topology to determine if eliminating and/or adding any given link would reduce a cost of the network.
- The network design module 140 may further allocate maximum delays to the links in proportion to the square root of an imputed cost for each link.
- The network design module 140 may also determine the size of a bandwidth by assigning virtual channels to each of a plurality of traffic classes with each virtual channel being sized separately and wherein a total bandwidth on the link is based on the sum of the bandwidths of the virtual channels as well as on a maximum utilization factor for the links.
- The network design module 140 may additionally determine the link lengths based on the marginal cost of the link with respect to the total traffic that is routed on it by taking the product of a marginal cost of the bandwidth with respect to current link bandwidth required and a marginal link bandwidth required with respect to the traffic routed on the link.
- The network design module 140 may use the same set of link lengths for every class of traffic based on a weighted sum of the link lengths determined separately for each traffic class.

Figure 2:
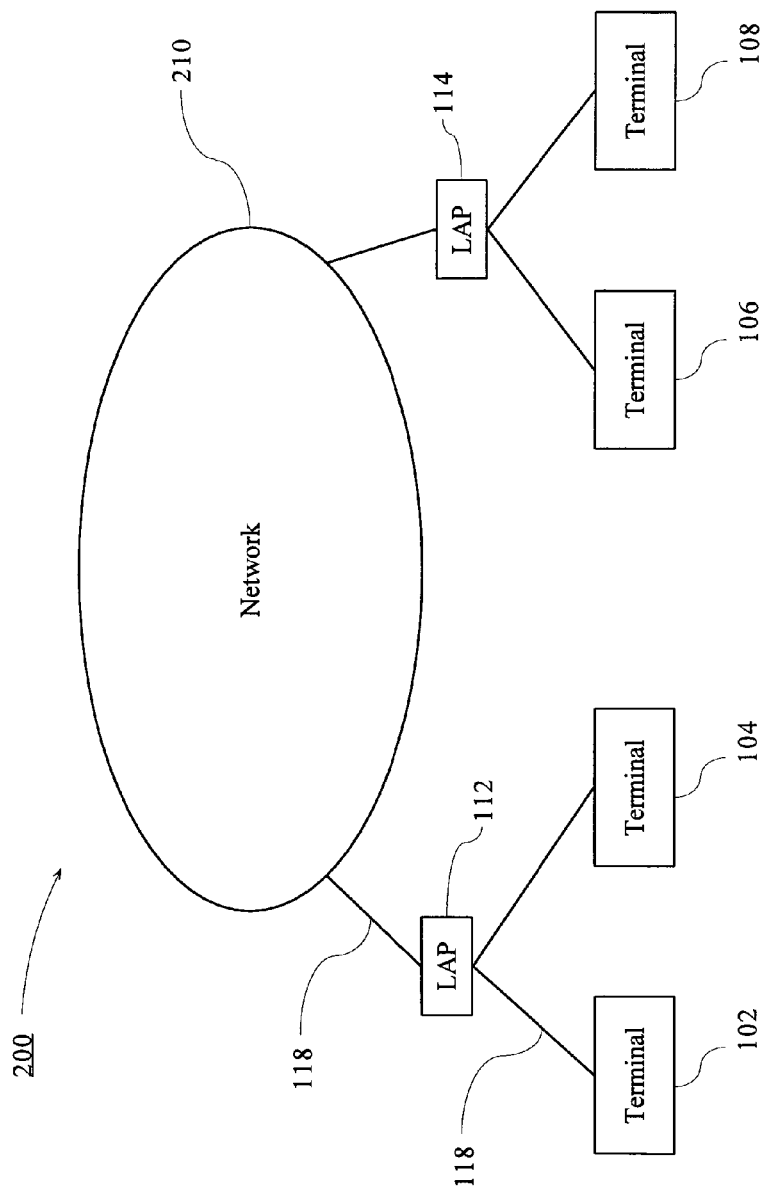
FIG. 2 is an exemplary block diagram of a network system.

FIG. 2 is an exemplary block diagram of a network system 200. The system 200 includes a plurality of terminals or nodes 102-108 in communication with a network 210 through Local Access Providers (LAPs) 112, 114. The LAPs 112, 114 may be any device that provides an interface to the network 210, such as company intranet servers, Internet Access Providers (IAPs), satellite base stations, cellular communication base stations and the like.

The terminals 102-108 can be devices of any type that allow for the transmission and/or reception of communications signals. For example, the terminals 102-108 can be land-line telephone, cellular telephones, computers, personal digital assistants, video telephones, video conference apparatuses, smart or computer assisted televisions, web access televisions and the like. For the purposes of the following description of the present invention, it will be assumed that terminals 102-108 are personal computers.

The terminals 102-108 are in connection with the network 210 over communication links 118. These communication links 118 may be any type of connection that allows for the transmission of information. Some examples include conventional telephone lines, fiber-optic lines, direct serial/parallel connections, cellular telephone connections, satellite communication links, local area networks (LANs), wide area networks (WANs), intranet and the like.

The network 210 may be a single network or a plurality of networks of the same or different types. For example, the network 210 may include a local telephone network (such as a Bell Atlantic network), in connection with a long distance network (such as a AT&T long distance network). Furthermore, the network may be a data network, an enterprise network or a telecommunications network in connection with a data network. An example of an enterprise network is a private data network utilized by a corporation or other enterprise. Any combination of telecommunications and data networks may be used without departing from the spirit and scope of the present invention. For the purposes of this discussion, it will be assumed that the network 210 is an enterprise network.

In operation, traffic is transmitted across network 210 from terminal 102 to terminal 108, for example. Traffic includes, for example, various communications, applications or the like. Traffic may include mission-critical applications such as stock investment transactions and other forms of electronic commerce. Traffic may also include other applications such as voice and video data. Such traffic is sensitive to delay over the network. Accordingly, these applications require better than best-effort IP network service. Other IP applications such as electronic mail, web browsing and file transfer may be able to tolerate considerable delay. Both delay-sensitive and delay tolerant applications may be served together.

Figure 3:
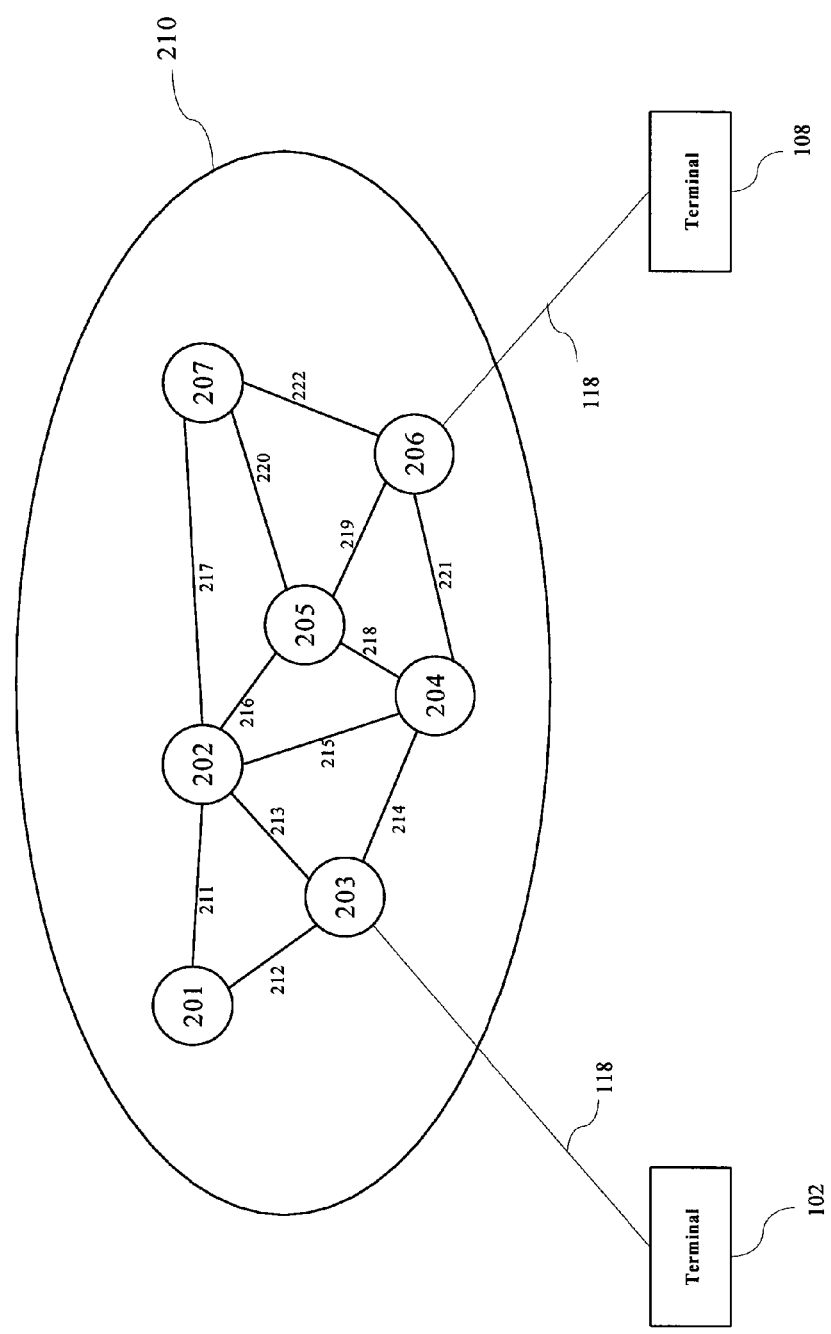
FIG. 3 is an exemplary block diagram of an architecture of a network.

FIG. 3 shows a more detailed block diagram of a possible architecture for the network 210. The network 210 may include routers 201-207 which are interconnected with each other by network links 211-222. The routers 201-207 can be Cisco routers, other IP routers or other such network elements, such as servers, network control units, or multi-point control units (MCU), of the network 210. For example, the terminals 102 and 108 may be connected to the routers 203 and 206 via communication links 118.

As an example of operation of the network 210, assume that the originating terminal 102 (shown in FIG. 2) is sending a communication or traffic to the destination terminal 108. The originating terminal 102 will generate various classes of traffic, will divide the traffic into a plurality of data packets for transmission and transmit the traffic via the communication link 118 to the first router 203. The router 203 will route the traffic, depending on the class, along different routes and routers 201-207 via network links 211-222 towards the destination terminal 108, so as to meet the specific delay requirements of each class and maximum link utilizations.

Providing an integrated network environment for all types of applications while satisfying individual performance requirements is called Quality of Service (QoS). QoS over IP may refer to differentiated performance based on class of service or traffic or may refer to guaranteed performance for certain classes. Differentiated performance gives certain classes of traffic priority treatment as they pass through the network 210. Guaranteed performance not only guarantees certain classes of traffic priority, but also guarantees the certain classes an end-to-end performance. An example of a guaranteed end-to-end performance may be a maximum guaranteed delay between originating terminal 102 and destination terminal 108. Priority traffic may be guaranteed an adequate portion of network resources by utilizing class-based queueing in the routers 201-207. The class-based queueing may allocate bandwidth to the traffic according to the various classes of traffic.

The network 210 may interconnect a number of routers 201-207, such as, for example, IP routers that are owned by an enterprise or by an Internet Service Provider (ISP). Each router 201-207 may have a class-based mechanism and may be connected to a serving office of a network provider by means of a private line and a port to a Permanent Virtual Circuit (PVC) network. Frame relay or asynchronous transfer mode PVCs may be set up across the network 210. These PVCs may provide dumb pipes that interconnect the routers. Tariff costs may be minimized by determining the network interconnections and the size of links in, for example, an IP network that provides QoS using class-based queueing.

Figure 4:
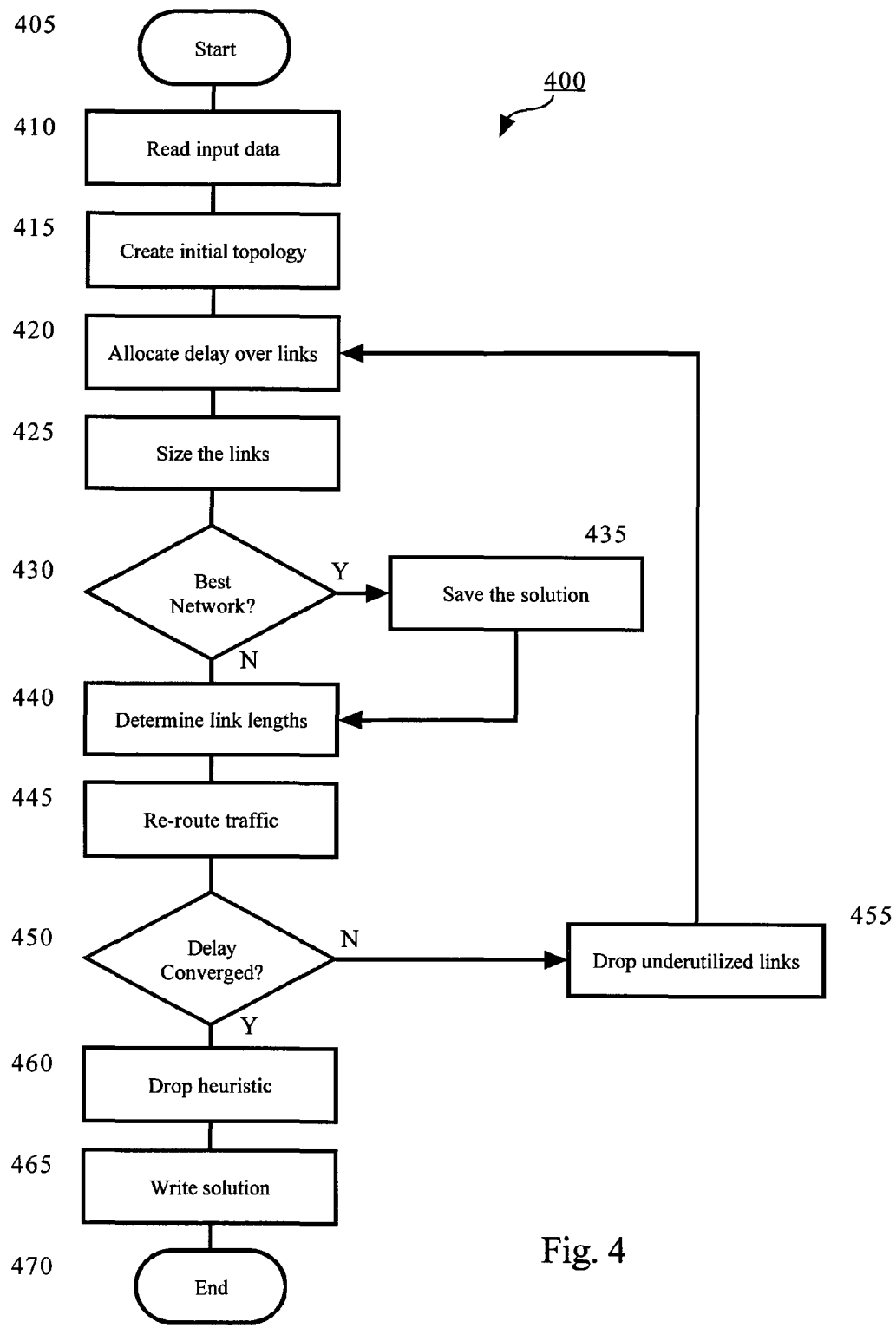
FIG. 4 is an exemplary flowchart outlining one method of network design according to the present invention.

FIG. 4 is an exemplary flowchart outlining the operation of a design function of the network design module 140 of FIG. 1. The network design module 140 may allow a designer to design a network 210 such as, for example, a packet data network that supports QoS, in which nodes originate and terminate traffic, so as to insure that a delay limit on node-to-node delay-sensitive communication is less than or equal to a specified threshold and that link utilization remains high. Once the design function is initiated in step 405, by, for example, a designer accessing the network design module 140, the design function reads input data in step 410. The input data may be entered by the designer using the input device 110. The input data may additionally be read from a file located in the database 150. The input data may include information on how classes of traffic are specified, minimum arrival rates, uniform bit error rates for transmission paths between routers, minimum utilization allowed on a PVC, maximum utilization allowed on a PVC, port or private line, information on the maximum or minimum number of iterations to be performed on the design, printing information, information regarding the type of routing (such as class-based routing or uniform routing), information regarding inclusion of routing update messages and the mean and variance of message sizes within the traffic stream, weights for the calculation of link lengths or link metrics, values of an independent variable used to compute numerical derivatives or gradient information (for the purpose of modifying link lengths or link metrics), information designating hub routers for possible classes of traffic, end-to-end maximum average directional full packet delays between routers for each class of traffic or any other data that may be useful in designing a network.

In step 415, the design function retrieves or creates an initial network topology and traffic routing based on a volume of traffic. The network topology may include links between elements of the network 210. The network topology creation may also include a determination of initial link lengths, metrics or weights. This step may include selection of an initial link length or metric based on the cost of a PVC class with the cheapest Committed Information Rate (CIR) speed in cost per kilobit. A distance factor may be added to this CIR cost to act as a tiebreaker in PVC class selection. Traffic is then routed across a fully connected network based on the initial link lengths.

In step 420, the design function allocates delay over the links. In this step, a maximum delay may be allocated to each link in the network topology so that delay limits on node-to-node communication are satisfied. For example, the maximum delay may be allocated in proportion to the square root of an imputed cost for each link. The imputed cost may be based on tariff costs of the link, arbitrary costs allocated to the link or other costs that may be associated with a link.

In step 425, the design function sizes the links. In this step, a bandwidth required for each link in the network topology may be sized based on a current traffic routing as well as a maximum delay over the link or link utilization. Additionally, the design function may size the bandwidth by computing the bandwidth required to satisfy allocated delays for all delay-sensitive traffic on the links and also satisfy the maximum link utilization for the network. Further, the design function may size the bandwidth by assigning virtual channels to each of a plurality of traffic classes. The bandwidth of each virtual channel may be sized separately and a total bandwidth on the link may be based on the sum of the bandwidths of the virtual channels as well as on a maximum utilization factor for the links.

In step 430, the design function determines if the current network design is the best network so far. This step may be accomplished by comparing the current network design to a network design previously saved in the database 150. If the current network is superior to the saved network on the basis of some relevant metric, such as cost to implement, the design function replaces the saved network with the current network in step 435. In either case, the design function continues to step 440.

In step 440, the design function determines or modifies link lengths. These link lengths may also be termed link metrics or link weights. A link length may be a value assigned to a link that quantifies how desirable the link is for routing traffic. Further, a link length may be based on a marginal cost of the link with respect to traffic routed on it by taking the product of a marginal cost of the bandwidth with respect to current link bandwidth required and a marginal link bandwidth required with respect to traffic routed on the link. This marginal cost determination may additionally be based on using the same set of link lengths for every class of traffic, based on a weighted sum of the link lengths determined separately for each traffic class. For example, a small link length value may indicate that a link is desirable for routing traffic.

In step 445, the design function re-routes traffic. This step may be accomplished by re-routing point-to-point traffic for each class of traffic over the current network topology based on a shortest path as specified by the current values of the link lengths determined in step 440. In step 450, the design function determines if the delay has converged. This step may be accomplished by determining if delay allocations have changed, based on whether the routings of the traffic have changed. For example, if the delay allocations differ between the current iteration of the network design function and a previous iteration, another iteration may be necessary and the design function advances to step 455. If the delay allocations are the same, the design function advances to step 460.

In step 455, the design function drops underutilized links. This step may be accomplished by deleting any link where a traffic arrival rate is less than the minimum arrival rate for each class of traffic. After the design function drops the underutilized links, the design function returns to step 420.

In step 460, the design function drops disadvantageous links to obtain an improved network design. This step may be accomplished by calculating the savings (in terms of cost to implement or other relevant metric) obtained from dropping each link in the network 210. Then, the link with the greatest positive savings, if any, may be dropped. When the link is dropped, the load on it may be rerouted, delay allocation may be recomputed for the links and the sizing of the entire network 210 may be repeated. This step may be repeated until no more savings may be achieved by dropping a single link.

In step 465, the design function writes the final network solution to the database 150. This step may be accomplished by writing the final network solution to port, PVC and link tables in the database 150. The design function may further print or otherwise output the network solution to the output device 130 or any other suitable output device. In step 470, the network design module 140 ends the design function.

The method of this invention is preferably implemented on a programmed processor. However, the network design module 140 may also be implemented on a general purpose or special purpose computer, a programmed microprocessor or microcontroller and peripheral integrated circuit elements, an ASIC or other integrated circuit, a hardware electronic or logic circuit such as a discrete element circuit, a programmable logic device such as a PLD, PLA, FPGA or PAL, or the like. In general, any device on which resides a finite state machine capable of implementing the flowcharts shown in FIG. 4 may be used to implement the processor functions of this invention.

While this invention has been described with specific embodiments thereof, it is evident that many alternatives, modifications, and variations will be apparent to those skilled in the art. Accordingly, the preferred embodiments of the invention as set forth herein are intended to be illustrative, not limiting. Various changes may be made without departing from the spirit and scope of the invention.

We claim:

1. The non-transitory computer-readable medium storing instructions which, when executed by a computing device, cause the computing device to participate as a network node in a network in which network nodes originate and terminate traffic, the instructions comprising:
   receiving incoming network traffic; and
   rerouting the incoming network traffic according to shortest paths with respect to link lengths, while maintaining delay related to node-to-node delay-sensitive communication below a specified threshold, wherein the link lengths are determined by steps comprising:
      obtaining an initial network topology including links and traffic routing based on a volume of traffic;
      allocating a maximum delay to each link in the network topology in proportion to a square root of an imputed cost for each of the links;
      sizing a bandwidth required for each of the links based on a current traffic routing and the maximum delay allocated to the link; and
      determining link lengths based on the sized bandwidth and the maximum delay.

2. The non-transitory computer-readable medium of claim 1, wherein sizing the required bandwidth is further based on a total link utilization.

3. The non-transitory computer-readable medium of claim 1, wherein allocating the maximum delay to each of the links further provides that established delay limits on node-to-node communication are satisfied.

4. The non-transitory computer-readable medium of claim 1, wherein the link lengths are further determined by repeating the obtaining, allocating, sizing, and determining steps until a network design ceases to change.

5. The non-transitory computer-readable medium of claim 1, wherein determining the link lengths further comprises systematically examining the network topology to determine if at least one of eliminating or adding any given link would reduce a cost of the network.

6. The non-transitory computer-readable medium of claim 1, wherein determining the link lengths further comprises determining the link lengths based on the marginal cost of the link with respect to the total traffic that is routed on it by taking the product of a marginal cost of the bandwidth with respect to current link bandwidth required and a marginal link bandwidth required with respect to traffic routed on the link.

7. The non-transitory computer-readable medium of claim 1, wherein the maximum delay allocation, link length and routing are determined separately for each of a plurality of traffic classes, and wherein the link bandwidths are sufficiently sized for all of the plurality of traffic classes.

8. The non-transitory computer-readable medium of claim 7, wherein the instructions further comprise systematically examining the network topology to determine if at least one of eliminating or adding any given link would reduce the cost of the network.

9. The non-transitory computer-readable medium of claim 7, wherein sizing the bandwidth further comprises assigning virtual channels to each of the plurality of traffic classes, with the bandwidth of each virtual channel being sized separately and wherein a total bandwidth on the link is based on the sum of the bandwidths of the virtual channels as well as on a maximum utilization factor for the links.

10. The non-transitory computer-readable medium of claim 7, wherein determining link lengths further comprises determining the link lengths based on the marginal cost of the link with respect to the total traffic that is routed on it by taking the product of a marginal cost of the bandwidth with respect to current link bandwidth required and a marginal link bandwidth required with respect to traffic routed on the link.

11. The non-transitory computer-readable medium of claim 10, wherein determining the link lengths is based on a same set of link lengths for every class of traffic based on a weighted sum of the link lengths determined separately for each traffic class.

12. A network node in a network in which network nodes originate and terminate traffic, the network comprising:
   a processor;
   a module controlling the processor to receive incoming network traffic; and
   a module controlling the processor to reroute the incoming network traffic according to shortest paths with respect to link lengths, while maintaining delay related to node-to-node delay-sensitive communication below a specified threshold, wherein the link lengths are determined by steps comprising:
      obtaining an initial network topology including links and traffic routing based on a volume of traffic;
      allocating a maximum delay to each link in the network topology in proportion to a square root of an imputed cost for each of the links;
      sizing a bandwidth required for each of the links based on a current traffic routing and the maximum delay allocated to the link; and
      determining link lengths based on the sized bandwidth and the maximum delay.

13. The network node of claim 12, wherein sizing the required bandwidth is further based on a total link utilization.

14. The network node of claim 12, wherein allocating the maximum delay to each of the links further provides that established delay limits on node-to-node communication are satisfied.

15. The network node of claim 12, wherein the link lengths are further determined by repeating the obtaining, allocating, sizing, and determining steps until a network design ceases to change.

16. The network node of claim 12, wherein determining the link lengths further comprises systematically examining the network topology to determine if at least one of eliminating or adding any given link would reduce a cost of the network.

17. A method for participating as a network node in a network in which network nodes originate and terminate traffic, the method causing a computing device to perform steps comprising:
    receiving incoming network traffic; and
    rerouting the incoming network traffic according to shortest paths with respect to link lengths, while maintaining delay related to node-to-node delay-sensitive communication below a specified threshold, wherein the link lengths are determined by steps comprising:
        obtaining an initial network topology including links and traffic routing based on a volume of traffic;
        allocating a maximum delay to each link in the network topology in proportion to a square root of an imputed cost for each of the links;
        sizing a bandwidth required for each of the links based on a current traffic routing and the maximum delay allocated to the link; and
        determining link lengths based on the sized bandwidth and the maximum delay.

18. The method of claim 17, wherein the maximum delay allocation, link length and routing are determined separately for each of a plurality of traffic classes, and wherein the link bandwidths are sufficiently sized for all of the plurality of traffic classes.

19. The method of claim 18, wherein the instructions further comprise systematically examining the network topology to determine if at least one of eliminating or adding any given link would reduce the cost of the network.

20. The method of claim 18, wherein sizing the bandwidth further comprises assigning virtual channels to each of the plurality of traffic classes, with the bandwidth of each virtual channel being sized separately and wherein a total bandwidth on the link is based on the sum of the bandwidths of the virtual channels as well as on a maximum utilization factor for the links.

* * * * *